US010640085B2

(12) United States Patent
Hocke et al.

(10) Patent No.: US 10,640,085 B2
(45) Date of Patent: May 5, 2020

(54) AUTHORIZING THE USE OF A MOTOR VEHICLE

(71) Applicant: Bayerische Motoren Werke Aktiengesellschaft, Munich (DE)

(72) Inventors: Fredrik Hocke, Munich (DE); Helmut Wagatha, Oberschleissheim (DE); Stefan Heinbockel, Munich (DE); Ralf Wistorf, Munich (DE)

(73) Assignee: Bayerische Motoren Wekre Aktiengesellschaft, Munich (DE)

( * ) Notice: Subject to any disclaimer, the term of this patent is extended or adjusted under 35 U.S.C. 154(b) by 0 days.

(21) Appl. No.: 16/009,362

(22) Filed: Jun. 15, 2018

(65) Prior Publication Data
US 2018/0290623 A1 Oct. 11, 2018

Related U.S. Application Data

(63) Continuation of application No. PCT/EP2016/068885, filed on Aug. 8, 2016.

(30) Foreign Application Priority Data

Dec. 18, 2015 (DE) .................... 10 2015 016 553

(51) Int. Cl.
B60R 25/24 (2013.01)
G07C 9/00 (2020.01)
(52) U.S. Cl.
CPC .......... B60R 25/24 (2013.01); G07C 9/00309 (2013.01); G07C 2009/00555 (2013.01); G07C 2209/63 (2013.01)
(58) Field of Classification Search
CPC ... B60R 25/24; B60R 25/245; G07C 9/00309; G07C 2009/00555; G07C 2209/63
USPC ..................... 340/5.64, 5.61, 5.72
See application file for complete search history.

(56) References Cited

U.S. PATENT DOCUMENTS

| 5,940,003 | A | 8/1999 | Schulz | |
|---|---|---|---|---|
| 6,218,932 | B1* | 4/2001 | Stippler | B60R 25/04 307/10.2 |
| 8,442,719 | B1* | 5/2013 | Nowottnick | G07C 9/00309 701/36 |
| 2002/0025823 | A1* | 2/2002 | Hara | B60R 25/24 455/456.5 |
| 2002/0033752 | A1* | 3/2002 | Greenwood | B60R 25/246 340/5.61 |
| 2003/0119453 | A1* | 6/2003 | Blatz | G06K 19/0723 455/73 |
| 2006/0214768 | A1* | 9/2006 | Hermann | B60R 25/24 340/5.61 |
| 2007/0188300 | A1 | 8/2007 | Kuhn | |
| 2012/0229254 | A1* | 9/2012 | Nowottnick | G07C 9/00309 340/5.61 |
| 2013/0063247 | A1 | 3/2013 | Blatz | |
| 2016/0148448 | A1* | 5/2016 | Blatz | B60R 25/24 340/5.61 |
| 2017/0021805 | A1 | 1/2017 | Haupt et al. | |
| 2018/0290624 | A1* | 10/2018 | Wagatha | B60R 25/24 |
| 2018/0290625 | A1* | 10/2018 | Wagatha | B60R 25/24 |
| 2018/0290626 | A1* | 10/2018 | Wagatha | B60R 25/24 |
| 2019/0016304 | A1* | 1/2019 | Hocke | B60R 25/24 |
| 2019/0023225 | A1* | 1/2019 | Heinbockel | G07C 9/00119 |
| 2019/0023226 | A1* | 1/2019 | Heinbockel | B60R 25/24 |
| 2019/0026967 | A1* | 1/2019 | Hocke | B60R 25/24 |
| 2019/0114857 | A1* | 4/2019 | Gustin | B60R 25/24 |

FOREIGN PATENT DOCUMENTS

| CN | 1914647 A | 2/2007 |
|---|---|---|
| CN | 102017296 A | 4/2011 |
| CN | 106370094 A | 2/2017 |
| DE | 10 2005 013 910 B3 | 9/2006 |
| DE | 10 2011 079 421 A1 | 1/2013 |
| EP | 0 867 971 A2 | 9/1998 |
| WO | WO 2009/143415 A1 | 11/2009 |
| WO | WO 2015/084852 A1 | 6/2015 |

OTHER PUBLICATIONS

Hermann, DE 102011079421, google patents translation from German published Jan. 16, 2014, with priority to Jul. 19, 2011 (Year: 2014).*
International Search Report (PCT/ISA/210) issued in PCT Application No. PCT/EP2016/068884 dated Oct. 27, 2016 with English translation (seven pages).
German-language Written Opinion (PCT/ISA/237) issued in PCT Application No. PCT/EP2016/068884 dated Oct. 27, 2016 (six pages).
German-language Search Report issued in counterpart German Application No. 10 2015 016 552.6 dated Jul. 6, 2016 with partial English translation (15 pages).
International Search Report (PCT/ISA/210) issued in PCT Application No. PCT/EP2016/068885 dated Oct. 27, 2016 with English translation (seven pages).
German-language Written Opinion (PCT/ISA/237) issued in PCT Application No. PCT/EP2016/068885 dated Oct. 27, 2016 (six pages).

(Continued)

Primary Examiner — Edwin C Holloway, III
(74) Attorney, Agent, or Firm — Crowell & Moring LLP

(57) ABSTRACT

A method for authorizing the use of a motor vehicle by a portable identification transmitter is provided. According to the method, a first vehicle antenna emits a first signal and a second vehicle antenna emits a second signal. An identification transmitter determines at least one of the spatial components of first and second electromagnetic fields, respectively, of the first and second signals. The identification transmitter transmits a measure or a value for the at least one spatial component of the first electromagnetic field, and a measure or a value for the at least one spatial component of the second electromagnetic field to the motor vehicle. A computer determines an angle between the spatial components of the first and second electromagnetic fields. The motor vehicle transmits an authorization signal for authorizing use of the motor vehicle only if the angle exceeds a predetermined threshold value.

17 Claims, 2 Drawing Sheets

(56) References Cited

OTHER PUBLICATIONS

German-language Search Report issued in counterpart German Application No. 10 2015 016 553.4 dated Jul. 6, 2016 with partial English translation (15 pages).
Chinese-language Office Action issued in Chinese Application No. 201680065074.0 dated Jan. 19, 2020 (nine (9) pages).

* cited by examiner

AUTHORIZING THE USE OF A MOTOR VEHICLE

CROSS REFERENCE TO RELATED APPLICATIONS

This application is a continuation of PCT International Application No. PCT/EP2016/068885, filed Aug. 8, 2016, which claims priority under 35 U.S.C. § 119 from German Patent Application No. 10 2015 016 553.4, filed Dec. 18, 2015, the entire disclosures of which are herein expressly incorporated by reference.

BACKGROUND AND SUMMARY OF THE INVENTION

The invention relates to a method for authorizing the use of a motor vehicle that has at least a first antenna and a second antenna, wherein the first antenna and the second antenna are at a physical interval from one another. The motor vehicle is in particular a two- or four-wheeled motor vehicle.

In the case of such known methods, it is desirable for them to be further improved against manipulations.

An object of the invention is to provide a method for authorizing the use of a motor vehicle with improved protection against manipulations.

This object is achieved in particular by a method for authorizing the use of a motor vehicle having the features of the independent method claim. Advantageous configurations of the method according to the invention are the subject matter of the dependent method claims.

The method according to the invention proceeds from a method for authorizing the use of a motor vehicle, in particular a two- or four-wheeled motor vehicle, that has at least a first antenna and a second antenna, wherein the first antenna and the second antenna are at a physical interval from one another, by a portable identification transmitter that has an identification transmitter antenna.

This known method is developed according to the invention by the following steps.

In a first step, the first vehicle antenna emits a first signal that is received via the identification transmitter antenna.

In a second step, the identification transmitter ascertains at least one of the spatial components of the first electromagnetic field of the received first signal, preferably using an angle-resolving magnetic field sensor.

In a third step, the second vehicle antenna emits a second signal that is received via the identification transmitter antenna.

In a fourth step, the identification transmitter ascertains at least one of the spatial components of the second electromagnetic field of the received second signal, preferably using the angle-resolving magnetic field sensor.

In a fifth step, the identification transmitter transmits a measure or a value for the ascertained at least one spatial component of the first electromagnetic field of the received first signal and a measure or a value for the ascertained at least one spatial component of the second electromagnetic field of the received second signal to the vehicle.

In a sixth step, a first computer, preferably a computer in the motor vehicle, ascertains the angle at least between the ascertained spatial component of the first electromagnetic field of the received first signal and the ascertained spatial component of the second electromagnetic field of the received second signal, and in a seventh step, the motor vehicle provides an authorization signal for authorizing the use of the motor vehicle only if the ascertained angle exceeds a predetermined threshold value.

In summary, the method according to the invention allows at least two physically separate or spaced transmitters to be used to determine the position of the receiver or of the identification transmitter in angle-resolved fashion. If the signals of the spaced transmitters are forwarded by a repeater with the intention of manipulation, the delay time is extended and the angle information is lost. The angle-resolving method according to the invention can detect such manipulation of the radio link by virtue of the parallelism of the signals being detected by the identification transmitter and/or by the motor vehicle and one or both of the latter preventing the emission of an authorization signal.

DETAILED DESCRIPTION OF THE EMBODIMENTS

Figure 1:
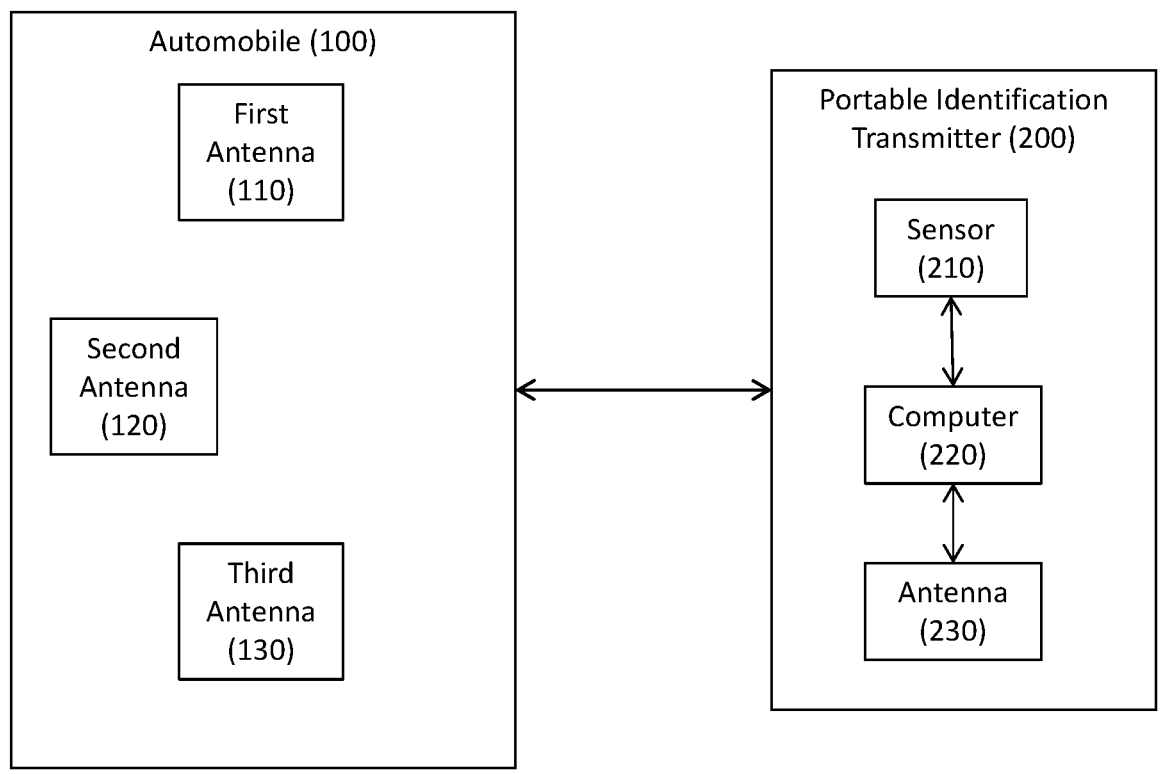
FIG. 1 illustrates a schematic block diagram of a vehicle entry system according to an exemplary embodiment of the present invention.

As illustrated in FIG. 1, a schematic block diagram of a vehicle entry system according to an exemplary embodiment of the present invention includes a first vehicle antenna 110, a second vehicle antenna 120, and a portable identification transmitter 200. The vehicle entry system may also include, for example, a third vehicle antenna 130. The portable identification transmitter 200 may include, for example, a sensor 210, a computer 220, and an antenna 230. The vehicle antennas communicate with the portable identification transmitter 200 wirelessly.

Figure 2:
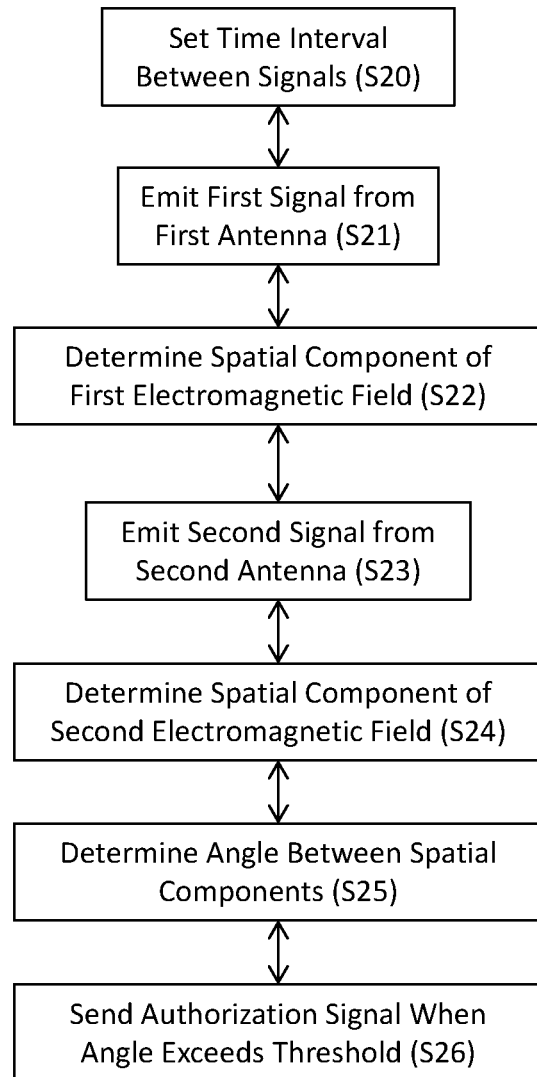
FIG. 2 illustrates a flow chart of a method according to an exemplary embodiment of the present invention.

FIG. 2 illustrates a flow chart of a method according to an exemplary embodiment of the present invention. According to the method, a time interval between signals emitted by the first and second antennas is set in step S20 so that the portable identification transmitter 200 carried by a driver is largely not moved when the driver approaches the motor vehicle, and therefore determination of the angle between the determined spatial component of the first electromagnetic field of the first signal and the determined spatial component of the second electromagnetic field of the second signal is largely not distorted, or does not become unusable, as a result of movement of the driver, or as a result of associated movement of the portable identification transmitter. In step S21, the first vehicle antenna 110 emits a first signal that is received by the identification transmitter antenna 230. The portable identification transmitter 200 determines, in step S22, spatial components of a first electromagnetic field of the first signal. In step S23, the second vehicle antenna 120 emits a second signal that is received by the identification transmitter antenna 230. The portable identification transmitter 200 determines, in step S24, spatial components of a second electromagnetic field of the second signal. In step S25, the computer 220 of the portable identification transmitter 200 determines an angle between the determined spatial component of the first electromagnetic field of the first signal and the determined spatial component of the second electromagnetic field of the second signal. In step S26, when the determined angle exceeds a predetermined threshold value, the portable identification transmitter 200 sends to the motor vehicle an authorization signal for authorizing use of the motor vehicle.

In one configuration of the method according to the invention, there is provision for the interval of time between the emission of the first signal by the first vehicle antenna and the emission of the second signal by the second vehicle antenna to be chosen to be such a short time—but different than zero—that the identification transmitter carried by the driver is largely not moved when the driver approaches the vehicle, and therefore the ascertainment of the angle at least between the ascertained spatial component of the first electromagnetic field of the received first signal and the ascertained spatial component of the second electromagnetic field of the received second signal is largely not distorted, or does not become unusable, as a result of the movement of the driver, or as a result of the associated movement of the identification transmitter.

The above measures allow particularly reliable ascertainment of the angle and hence particularly reliable determination of whether the predetermined threshold value is exceeded to be achieved.

In accordance with a further embodiment of the method according to the invention, the motor vehicle has a further, third antenna that is at a physical interval from both the first antenna and the second antenna and in that analogously or in the same way the angle at least between the ascertained spatial component of the first electromagnetic field of the received first signal and the ascertained spatial component of the third electromagnetic field of a third signal emitted by the third antenna and received by the identification transmitter is determined.

These measures allow the reliability during the ascertainment of the angle, and hence the determination of whether the predetermined threshold value is exceeded, to be increased further.

In an advantageous configuration of the method according to the invention, there is provision for the spatial components of the first electromagnetic field of the received first signal that are ascertained by the identification transmitter to be the x, y and z components of the electromagnetic field of a first Cartesian coordinate system.

In accordance with an advantageous development of the method according to the invention, there is provision for the spatial components of the second electromagnetic field of the received second signal that are ascertained by the identification transmitter to be the x, y and z components of the electromagnetic field, largely the components with reference to the first Cartesian coordinate system. This is the case largely because the Cartesian coordinate system or reference system underlying the ascertainment of the components changes only slightly in spatial terms in the event of slight movements of the identification transmitter in very short periods between the repeated ascertainment of the angles.

In one configuration of the method according to the invention, the spatial components of the third electromagnetic field of the received third signal that are ascertained by the identification transmitter are the x, y and z components of the electromagnetic field, largely those of the first Cartesian coordinate system.

The above measures allow a particularly reliable determination of the angle between the ascertained spatial components of the first electromagnetic field of the received first signal and the ascertained spatial components of the second electromagnetic field of the received second signal and/or between the ascertained spatial components of the third electromagnetic field of the received third signal to be achieved.

In an advantageous development of the method according to the invention, there is provision for at least a first vector from the x, y and z components of the first electromagnetic field of the received first signal that are ascertained by the identification transmitter and a second vector from the x, y and z components of the second electromagnetic field of the received second signal that are ascertained by the identification transmitter to be formed computationally and, from these two vectors, the scalar product thereof to be formed computationally.

In accordance with a particularly advantageous development of the method according to the invention, the scalar product is used to computationally determine the angle between the two vectors.

Computing the angle between the two vectors using the scalar product requires only a small computational outlay or a low processor power.

In accordance with a particularly preferred embodiment of the method according to the invention, there is provision for the ascertained angle to exceed a predetermined threshold value of largely zero degrees, in particular a threshold value greater than 1 to 10 degrees, preferably 1 to 5 degrees.

In an advantageous development of the method according to the invention, the threshold value that is greater than zero degrees is increased as the distance of the identification transmitter from the vehicle decreases. Preferably, the distance is determined by means of a delay-time measurement between the signals that are interchanged between vehicle and identification transmitter.

In accordance with a preferred embodiment of the method according to the invention, there is provision for the first, second and third antennas each to send on an identical or different frequency in a frequency range from 20 kHz to 140 kHz, preferably on approximately 125 kHz, preferably with staggered timing.

The above measures allow the reliability of the method according to the invention for authorizing the use of a motor vehicle to be improved additionally.

Besides the advantageous method according to the invention for authorizing the use of a motor vehicle, the invention allows the provision of a vehicle entry system for authorizing the use of a motor vehicle, the vehicle entry system being involved in the performance of a method according to the invention or performing a method according to the invention.

In an advantageous development of the vehicle entry system according to the invention, there is provision for the identification transmitter to be a radio key or a smartphone, preferably with an identification transmitter software application, such as what is known as an app.

In accordance with an advantageous configuration of the vehicle entry system according to the invention, the identification transmitter is a smartphone provided with a computer chip, a radio vehicle key provided with a computer chip or a chip card with a computer chip.

In one embodiment of the vehicle entry system according to the invention, the identification transmitter has a sensor for determining or ascertaining an electromagnetic field and/or the components of the electromagnetic field that has been generated by one or more vehicle antennas in the region of the identification transmitter.

The above features of the vehicle entry system according to the invention allow the driver to be provided with particularly convenient use of the method according to the invention for authorizing the use of a motor vehicle.

The invention moreover proposes an engine immobilizer for authorizing the use of a motor vehicle that is advantageously involved in the performance of a method according to the invention or performs a method according to the invention.

Further, a motor vehicle is proposed that has provision for at least one step of a method according to the invention as claimed in one of the preceding claims to be performed in the motor vehicle.

Finally, the invention proposes a non-transitory computer-readable medium for controlling at least one processor that prompts the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for authorizing use of a motor vehicle that has at least a first antenna and a second antenna, wherein the first antenna and the second antenna are at a physical interval from one another, by a portable identification transmitter that has an identification transmitter antenna, the method comprising:
    emitting, by the first vehicle antenna, a first signal that is received by the identification transmitter antenna;
    determining, by the portable identification transmitter, at least one of spatial components of the first electromagnetic field of the first signal;
    emitting, by the second vehicle antenna, a second signal that is received by the identification transmitter antenna;
    determining, by the portable identification transmitter, at least one of spatial components of a second electromagnetic field of the second signal, using an angle-resolving magnetic field sensor;
    transmitting, by the portable identification transmitter, a measure or a value for the at least one spatial component of the first electromagnetic field of the first signal and a measure or a value for the at least one spatial component of the second electromagnetic field of the second signal to the motor vehicle;
    determining, by a computer in the motor vehicle, an angle between the spatial component of the first electromagnetic field of the first signal and the spatial component of the second electromagnetic field of the second signal; and
    outputting, by the motor vehicle, an authorization signal for authorizing use of the motor vehicle only if the angle exceeds a threshold value;
    wherein the threshold value, which is greater than zero degrees, is increased as a distance of the portable identification transmitter from the motor vehicle decreases, wherein the distance is determined by a delay-time measurement between signals that are interchanged between the motor vehicle and the portable identification transmitter.

2. The method for authorizing the use of the motor vehicle as claimed in claim 1, wherein an interval of time greater than zero between emission of the first signal by the first vehicle antenna and emission of the second signal by the second vehicle antenna is chosen such that the portable identification transmitter carried by a driver is not moved when the driver approaches the motor vehicle, and therefore determination of the angle between the spatial component of the first electromagnetic field of the first signal and the spatial component of the second electromagnetic field of the second signal is not distorted, or does not become unusable, as a result of movement of the driver, or as a result of associated movement of the portable identification transmitter.

3. The method for authorizing the use of the motor vehicle as claimed in claim 1, wherein the motor vehicle has a third antenna that is at a physical interval from both the first antenna and the second antenna and the angle between the spatial component of the first electromagnetic field of the first signal and a spatial component of a third electromagnetic field of a third signal emitted by the third antenna and received by the portable identification transmitter is determined.

4. The method for authorizing the use of the motor vehicle as claimed in claim 3, wherein the spatial components of the first electromagnetic field of the first signal that are determined by the portable identification transmitter are x, y and z components of the electromagnetic field of a first Cartesian coordinate system.

5. The method for authorizing the use of the motor vehicle as claimed in claim 4, wherein the spatial components of the second electromagnetic field of the second signal that are determined by the portable identification transmitter are the x, y and z components of the electromagnetic field of the first Cartesian coordinate system, because the first Cartesian coordinate system or reference system underlying determination of the spatial components remains constant in spatial terms in an event of movements of the portable identification transmitter in periods between repeated ascertainment of the angles.

6. The method for authorizing the use of the motor vehicle as claimed in claim 4, wherein the spatial components of the third electromagnetic field of the third signal that are determined by the portable identification transmitter are the x, y and z components of the electromagnetic field of the first Cartesian coordinate system.

7. The method for authorizing the use of the motor vehicle as claimed in claim 4, wherein at least a first vector from the x, y and z components of the first electromagnetic field of the first signal that are determined by the portable identification transmitter and a second vector from the x, y and z components of the second electromagnetic field of the second signal that are determined by the portable identification transmitter are formed computationally and, from these two vectors, a scalar product thereof is formed computationally.

8. The method for authorizing the use of the motor vehicle as claimed in claim 7, wherein the scalar product is used to computationally determine the angle between the two vectors.

9. The method for authorizing the use of the motor vehicle as claimed in claim 8, wherein the threshold value is 1 to 5 degrees.

10. The method for authorizing the use of the motor vehicle as claimed in claim 3, wherein the first, second and third antennas each send on an identical or different frequency in a frequency range from 20 kHz to 140 kHz with staggered timing.

11. A vehicle entry system for authorizing the use of the motor vehicle, comprising:
    at least a first antenna and a second antenna, wherein the first antenna and the second antenna are at a physical interval from one another; and
    a portable identification transmitter that has an identification transmitter antenna;
    wherein the first vehicle antenna is configured to emit a first signal that is received by the identification transmitter antenna, and the portable identification transmitter is configured to determine at least one of spatial components of a first electromagnetic field of the first signal;

wherein the second vehicle antenna is configured to emit a second signal that is received by the identification transmitter antenna, and the portable identification transmitter is configured to determine at least one of spatial components of a second electromagnetic field of the second signal, using an angle-resolving magnetic field sensor;

wherein a computer in the motor vehicle is configured to determine an angle between the spatial component of the first electromagnetic field of the first signal and the spatial component of the second electromagnetic field of the second signal;

wherein the motor vehicle is configured to send an authorization signal for authorizing use of the motor vehicle only if the determined angle exceeds a threshold value; and wherein the threshold value, which is greater than zero degrees, is increased as a distance of the portable identification transmitter from the motor vehicle decreases, wherein the distance is determined by a delay-time measurement between signals that are interchanged between the motor vehicle and the portable identification transmitter.

12. The vehicle entry system for authorizing the use of the motor vehicle as claimed in claim 11, wherein the portable identification transmitter is a radio key or a smartphone with an identification transmitter software application.

13. The vehicle entry system for authorizing the use of the motor vehicle as claimed in claim 11, wherein the portable identification transmitter is a smartphone provided with a computer chip, a radio vehicle key provided with a computer chip or a chip card with a computer chip.

14. The vehicle entry system for authorizing the use of the motor vehicle as claimed in claim 11, wherein the portable identification transmitter has a sensor for determining at least one of an electromagnetic field and components of the electromagnetic field that have been generated by one or more vehicle antennas in a region of the portable identification transmitter.

15. The vehicle entry system for authorizing the use of the motor vehicle as claimed in claim 12, wherein the portable identification transmitter has a sensor for determining at least one of an electromagnetic field and components of the electromagnetic field that have been generated by one or more vehicle antennas in a region of the portable identification transmitter.

16. The vehicle entry system for authorizing the use of the motor vehicle as claimed in claim 13, wherein the portable identification transmitter has a sensor for determining at least one of an electromagnetic field and components of the electromagnetic field that have been generated by one or more vehicle antennas in a region of the portable identification transmitter.

17. A non-transitory computer-readable medium comprising computer instructions executable by a processor to cause the processor to perform a method for authorizing use of a motor vehicle that has at least a first antenna and a second antenna, wherein the first antenna and the second antenna are at a physical interval from one another, by a portable identification transmitter that has an identification transmitter antenna, the method comprising:

emitting, by the first vehicle antenna, a first signal that is received by the identification transmitter antenna;

determining, by the portable identification transmitter, at least one of spatial components of the first electromagnetic field of the first signal;

emitting, by the second vehicle antenna, a second signal that is received by the identification transmitter antenna;

determining, by the portable identification transmitter, at least one of spatial components of a second electromagnetic field of the second signal, using an angle-resolving magnetic field sensor;

transmitting, by the portable identification transmitter, a measure or a value for the at least one spatial component of the first electromagnetic field of the first signal and a measure or a value for the at least one spatial component of the second electromagnetic field of the second signal to the motor vehicle;

determining, by a computer in the motor vehicle, an angle between the spatial component of the first electromagnetic field of the first signal and the spatial component of the second electromagnetic field of the second signal; and outputting, by the motor vehicle, an authorization signal for authorizing use of the motor vehicle only if the angle exceeds a threshold value;

wherein the threshold value, which is greater than zero degrees, is increased as a distance of the portable identification transmitter from the motor vehicle decreases, wherein the distance is determined by a delay-time measurement between signals that are interchanged between the motor vehicle and the portable identification transmitter.

* * * * *